US012608122B2

(12) United States Patent
Huang et al.

(10) Patent No.: US 12,608,122 B2
(45) Date of Patent: Apr. 21, 2026

(54) IMAGE SYNTHESIS WITH MULTIPLE INPUT MODALITIES

(71) Applicant: NVIDIA Corp., Santa Clara, CA (US)

(72) Inventors: Xun Huang, Santa Clara, CA (US); Ting Wang, Santa Clara, CA (US); Arun Mallya, Santa Clara, CA (US); Ming-Yu Liu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 79 days.

(21) Appl. No.: 17/954,872

(22) Filed: Sep. 28, 2022

(65) Prior Publication Data

US 2023/0161467 A1 May 25, 2023

Related U.S. Application Data

(60) Provisional application No. 63/282,813, filed on Nov. 24, 2021.

(51) Int. Cl.
| | |
|---|---|
| *G06F 3/04845* | (2022.01) |
| *G06F 3/04847* | (2022.01) |
| *G06T 11/60* | (2026.01) |

(52) U.S. Cl.
CPC ...... *G06F 3/04845* (2013.01); *G06F 3/04847* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 10,140,392 B1* | 11/2018 | Bowen | ............... | G06F 30/00 |
| 2013/0167087 A1* | 6/2013 | Tighe | ............... | G06F 3/0481 |
| | | | | 715/811 |
| 2021/0097691 A1* | 4/2021 | Liu | ............... | G06V 10/764 |
| 2023/0051195 A1* | 2/2023 | Cho | ............... | G06V 30/347 |

OTHER PUBLICATIONS

Transcription of "Nvidia AI Playground | GauGAN Beta" (CG Tricks/YouTube, Jun. 17, 2019) as downloaded from https://youtu.be/UpmqR2ZCPFQ on May 16, 2023.
Transcription of "Tutorial for Using GauGAN2 Web Demo" (Gaugan Nvidia/YouTube, Nov. 22, 2021) as downloaded from https://www.youtube.com/watch?v=r5P9-zOfWyE on May 16, 2023.
Creswell, et al., "Generative Adversarial Networks: An Overview," arXiv:1710.07035v1 (arXiv, 2017).
Goodfellow, et al., "Generative Adversarial Nets," arXiv:1406.2661v1 (arXiv, 2014).
Huang, et al., "Multimodal Image Synthesis with Product-of-Experts GANs," arXiv:2112.05130v1 (arXiv, 2021).

(Continued)

*Primary Examiner* — Aaron M Richer

(57) ABSTRACT

Techniques are described for synthesizing images with multiple input modalities. According to some embodiments, a user interface is displayed. The user interface comprises an input area operable to display one or more inputs corresponding to one or more input modalities, an output area operable to display an output image generated based on the one or more inputs, and at least one control operable to select which ones of the one or more input modalities should influence generation of the output image.

34 Claims, 18 Drawing Sheets

(56) References Cited

OTHER PUBLICATIONS

Kathuria, "Understanding GauGAN Part1: Unraveling Nvidia's Landscape Painting GANs, " as downloaded on Nov. 15, 2021 from https://blog.paperspace.com/nvidia-gaugan-introduction/.

Kathuria, "Understanding GauGAN Part 2: Training on Custom Datasets," as downloaded on Nov. 15, 2021 from https://blog.paperspace.com/gaugan-training-on-custom-datasets/.

Kathuria, "Understanding GauGAN Part 3: Model Evaluation Techniques," as downloaded on Nov. 15, 2021 from https://blog.paperspace.com/gaugan-evaluation-techniques/.

Kathuria, "Understanding GauGAN Part 4: Debugging Training & Deciding If GauGAN Is Right For You," as downloaded on Nov. 15, 2021 from https://blog.paperspace.com/debugging-gaugan-training-and-business-considerations/.

Park, et al., "Semantic Image Synthesis with Spatially-Adaptive Normalization," arXiv:1903.07291v2 (arXiv 2019).

Radford, et al., "Learning Transferable Visual Models From Natural Language Supervision," arXiv:2103.00020v1 (arXiv 2021).

Salian, "Stroke of Genius: GauGAN Turns Doodles into Stunning, Photorealistic Landscapes," as downloaded on Nov. 15, 2021 from https://blogs.nvidia.com/blog/2019/03/18/gaugan-photorealistic-landscapes-nvidia-research/.

Zhu, et al., "Semantically Multi-modal Image Synthesis," arXiv:2003.12697v3 (arXiv, 2020).

* cited by examiner

100 text

102 sketch

104 seg (a) text (b) sketch (c) seg (d) text + sketch (e) text + seg (f) sketch + seg (g) text + sketch + seg 706 700

1200

1500    1502

1504

706    1600    708    1602

1900     1902

706         708

2002

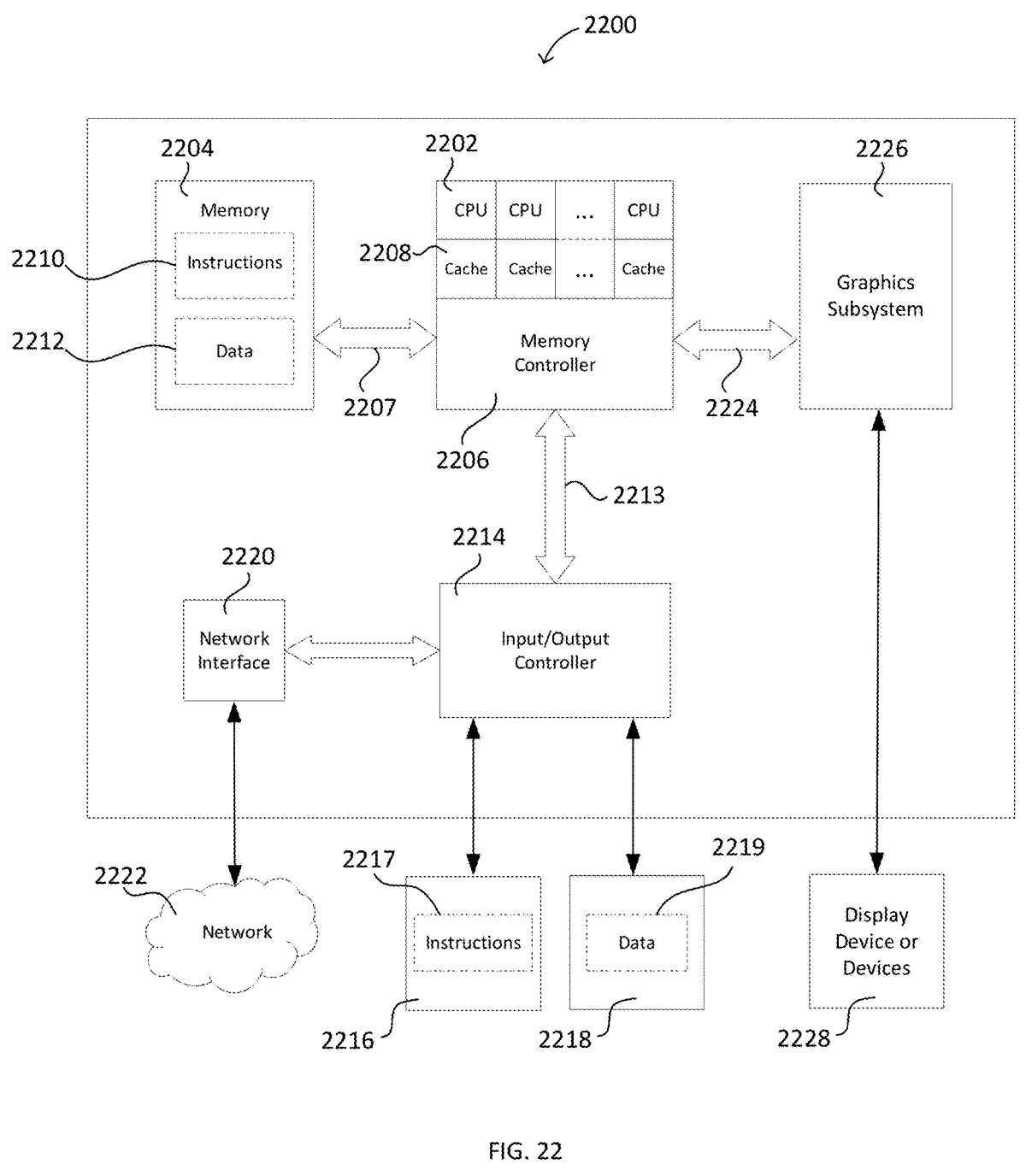

2200

2204  2202  2226

Memory

2210  Instructions

2212  Data

2208

| CPU | CPU | ... | CPU |
|-----|-----|-----|-----|
| Cache | Cache | ... | Cache |

Memory Controller

Graphics Subsystem

2207

2206

2224

2213

2220

2214

Network Interface

Input/Output Controller

2222

Network

2217

2216  Instructions

2219

2218  Data

2228  Display Device or Devices

FIG. 22

IMAGE SYNTHESIS WITH MULTIPLE INPUT MODALITIES

CROSS-REFERENCE TO RELATED APPLICATIONS

This application claims benefit to the filing date of U.S. Provisional Application 63/282,813, filed Nov. 24, 2021, titled "Image Synthesis with Multiple Input Modalities," the contents of which are hereby incorporated by reference as if entirely set forth herein.

BACKGROUND

The ability to generate new and creative images has long been highly valued. In the past, doing so has been a largely manual task that traditionally has required significant talent, training, or labor. More recently, computers have been employed to assist in this task, with the result that new images can now be created by human users with the use of software applications.

For example, computer-aided design ("CAD") software applications provide a user interface that enables human users to manually manipulate existing templates to create drawings of new structures, while other software applications enable human users to draw pictures in a freehand fashion using various simple input tools such as a pencil or brush and a color palette, each of which is presented next to a drawing canvas in a graphical user interface ("GUI").

Despite these advancements, existing tools limit the ability of human users to express their ideas—at least in part because of the limited modes that such tools afford to the users for expressing them. A need therefore exists for improved user interfaces that provide human users with more complex modes in which they can express ideas as inputs during the process of creating new images.

BRIEF DESCRIPTION OF THE DRAWINGS

FIG. 22 illustrates an example computing device suitable for use with the user interface of FIG. 7.

DETAILED DESCRIPTION

Figure 1:
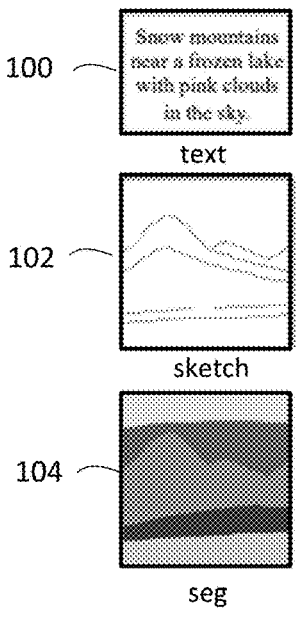
FIG. 1 is a block diagram illustrating three example inputs in three different example input modalities.

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others.

The phrases "configured to," "operable to" and the like as used herein mean that the referenced item, when operated, can perform the described function. In this sense an item can be "configured to" perform a function or can be "operable to" perform a function even when the item is not operating and is therefore not currently performing the function. Use of the phrases "configured to," "operable to" and the like herein does not necessarily mean that the described item has been modified in some way relative to a previous state.

"Coupled" as used herein refers to a connection between items. Such a connection can be direct or can be indirect through connections with other intermediate items.

Terms used herein such as "including," "comprising," and their variants, mean "including but not limited to."

Articles of speech such as "a," "an," and "the" as used herein are intended to serve as singular as well as plural references except where the context clearly indicates otherwise.

The words "display," "displaying," "displayed" and their variants as used herein mean and include any of a variety of activities related to the visual representation of an item. For example, "displaying" an item may be accomplished by displaying the item on one or more display devices or may be accomplished by printing a visual representation of the item. "Displaying" an item may also be accomplished by generating commands that can cause the item to be displayed on one or more display devices and/or generating data that can be displayed on one or more display devices, or both, regardless of whether the item is actually displayed on a display device. Commands that can cause an item to be displayed may comprise, for example, commands directed to a graphics subsystem of a host computer. Data that can be displayed may comprise, for example, a bit map or similar representation of a rendered image. In any embodiments, such commands or data may be stored on a suitable computer-readable medium, or they may be sent over one or more communication paths within a host computer (e.g. a graphics bus), or they may be sent over a network to one or more other host computers using appropriate network protocols, or all of these. In any embodiments, the display of an item may occur on one or more local display devices, or the display may occur on one or more remotely located display devices, or both. In embodiments that involve one or more computing devices, the display of an item may or may not occur in association with the same computing device that generates commands or data that cause the display. For example, a user interface element may be displayed in association with a local computing device such as in a web browser, and commands or data that cause the display of the same or a different user interface element may be generated by a remotely located computing device such as a web server and sent to the local computing device over a network.

Generative Neural Networks

The phrase "generative neural network" refers to a class of neural networks in the field of machine learning. A generative neural network ("GNN") is a type of neural network that has been trained to generate an artifact in response to a numerical input. Although a numerical input to a GNN may be random or may include randomly introduced elements, a characteristic feature of a trained GNN is that the artifacts that it generates in response to such an input will resemble other artifacts that constitute points in a probability distribution that the GNN was trained to emulate. For example, a large training set of digital landscape images may represent points in a probability distribution of images whose features correspond to landscapes. After a GNN has been trained on the set of landscape images, a random or semi-random input may be applied to the GNN. In response to the input, the GNN will generate an image that resembles a landscape—even though the generated image may differ in various ways from each of the images that were included in the training set.

Numerous techniques exist for training a GNN. One such technique is to use what is known as a generative adversarial network ("GAN"). The GAN concept is to train two neural networks in tandem while essentially placing one of the networks in competition with the other. During training, one of the two networks (the "discriminator" or "D") learns to classify inputs as belonging to one of two categories: those that belong to a set of authentic examples (e.g., the training set), and those that do not. Meanwhile the other network (the "generator" or "G") attempts to learn the probability distribution of the authentic examples through its interactions with the discriminator. It does so during a process in which it generates synthetic examples based on noise inputs and presents the synthetic examples to the discriminator for classification.

In this process, which is explained more fully, for example, in Goodfellow, et al., "Generative Adversarial Nets," arXiv:1406.2661v1 [stat.ML] (2014), and in Creswell, et al., "Generative Adversarial Networks: An Overview," arXiv:1710.07035v1 [cs.CV] (2017), a cost function is employed to optimize both the generator and the discriminator. For example, the training process may seek to optimize both G and D by solving for $$\max_D \min_G V(G,D) \tag{1}$$

given a cost function such as $$V(G,D) = E_{Pdata(x)} \log D(x) + E_{Pg(x)} \log(1-D(x)) \tag{2}$$

and numerous examples x, where $E_{Pdata(x)} \log D(x)$ is the expected value of $\log D(x)$ for examples x taken from the set of authentic examples, $E_{Pg(x)} \log(1-D(x))$ is the expected value of $\log(1-D(x))$ for synthetic examples x taken from the output of the generator, and $D(x)$ is the probability that a given example x came from the set of authentic examples rather than from the generator. With such a cost function applied during training, the generator becomes optimal when $p_{g(x)} = p_{data(x)}$. In other words, the generator becomes optimal when the probability density function corresponding to synthetic examples is the same as the probability density function corresponding to the authentic examples, signifying that the generator has successfully learned the probability density function of the training set. After this occurs, the probability produced by the discriminator will be 0.5 for all examples x regardless of the set from which the examples are drawn.

Once so trained, the generator may be used independently of the discriminator to generate further synthetic examples, each of which will resemble examples from the training set. Such a generator is an example of a GNN as that term is used herein.

Synthesizing Images Using Multiple Distinct Input Modalities

Figure 2:
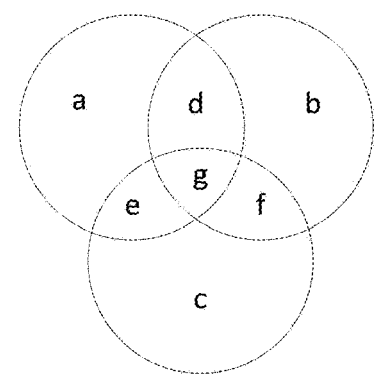
FIG. 2 is a Venn diagram illustrating seven different ways in which the input modalities of FIG. 1 may be combined to generate an output image.
Figure 3:
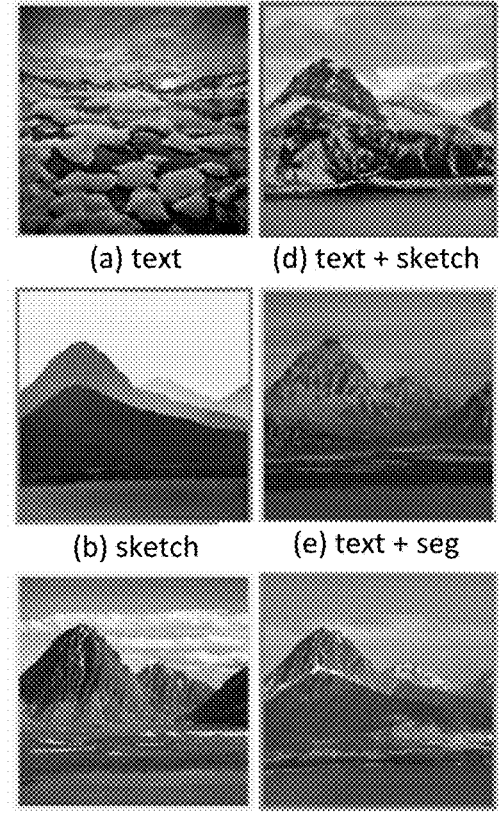
FIG. 3 illustrates seven different example output images, each corresponding to one of the combinations illustrated in FIG. 2.
Figure 3:
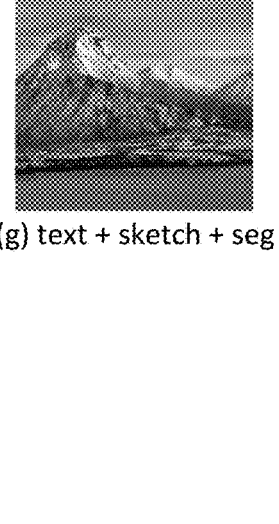

FIGS. 1-3 provide an illustrative example of image synthesis using multiple input modalities. In FIG. 1, three example inputs 100, 102, 104 are presented. Each example input represents a different input modality. Input 100 represents a text input modality. Input 102 represents a sketch input modality. Input 104 represents a segmentation map input modality (abbreviated in the drawing as "seg").

FIG. 2 is a Venn diagram illustrating the ways in which each of the inputs of FIG. 1 might be combined to synthesize an output image. Assume that areas a, b, and c in FIG. 2 correspond to inputs 100 (text), 102 (sketch), and 104 (seg), respectively. Area d, then, corresponds to the combination of inputs 100 (text) and 102 (sketch), but not input 104 (seg). Area e corresponds to the combination of inputs 100 (text) and 104 (seg), but not input 102 (sketch). Area f corresponds to the combination of inputs 102 (sketch) and 104 (seg), but not input 100 (text). Area g corresponds to the combination of all three of the inputs.

FIG. 3 presents several example output images that may be generated, each in accordance with one of the combinations of inputs illustrated in FIG. 2.

Example GNNs

A variety of techniques may be employed to produce output images such as those illustrated in FIG. 3 based on the input modalities and the input modality combinations illustrated in FIGS. 1 and 2. One such technique is to use a product of experts GAN network as described in Huang, et al., "Multimodal Conditional Image Synthesis with Product-of-Exerts GANs," arXiv:2112.05130v1 (arXiv, Dec. 9, 2021), the contents of which are hereby incorporated by reference as if entirely set forth herein. The architecture described by Huang, et al., however, is mentioned here by way of example and not by way of limitation. Persons having skill in the art and having reference to this disclosure will appreciate that other types of GNN frameworks may also be used in embodiments, and that the implementation details of such frameworks may differ from those described by Huang, et al.

Figures 4, 5:
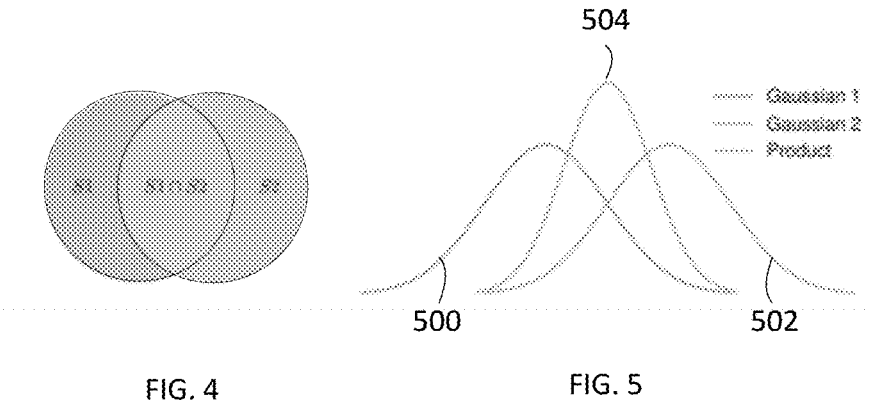
FIG. 4 is a Venn diagram illustrating the intersection of two sets S1 and S2.
FIG. 5 illustrates a product distribution generated from two Gaussian input distributions.
Figure 6:
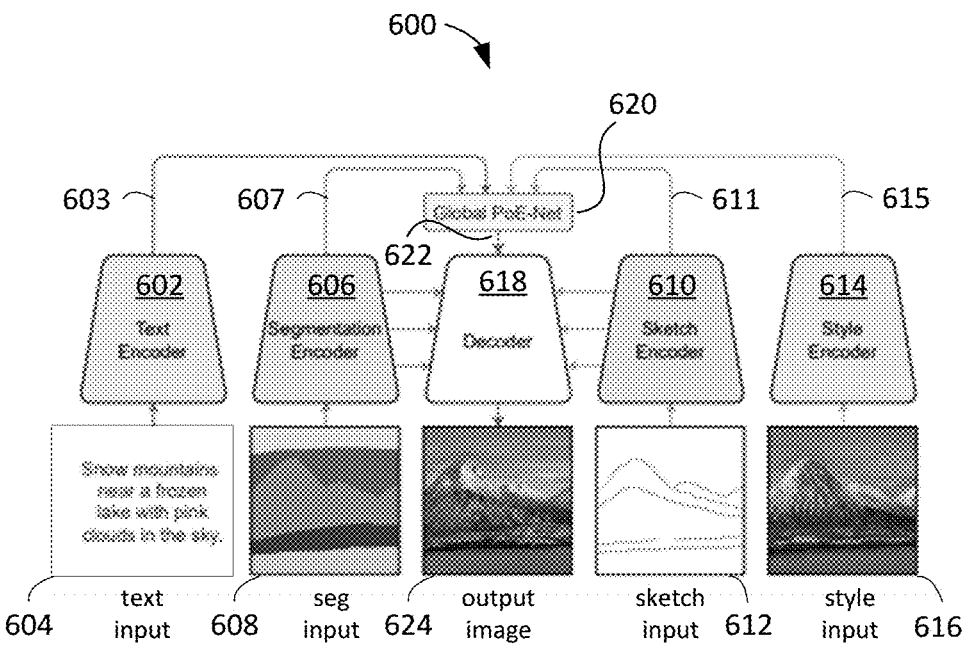
FIG. 6 illustrates an example architecture that may be employed to generate an output image based on one or more selected input modalities.

In the product of experts GAN network described by Huang, et al., each input modality adds a constraint that a synthesized output image must satisfy. Referring now to the example shown in FIG. 4, the set of output images that satisfies all such constraints corresponds to the intersection, S1∩S2, of the sets S1 and S2, where each of sets S1 and S2 satisfies one of the input modality constraints in isolation. By way of further example, assume that the jointly conditioned probability distribution $p(x|y_i, y_j)$ is proportional to the product of singly-conditioned probability distributions $p(x|y_i)$ and $p(x|y_j)$. Under this assumption, the singly-conditioned probability distributions (for example, distributions 500 and 502) can be combined by multiplying them to produce the jointly conditioned distribution (for example, distribution 504). The product of experts GAN framework described by Huang, et al., can be used similarly, to combine several probability distributions (the "experts") to produce a resultant probability distribution suitable for use in synthesizing an output image. To do so, an architecture such as the one illustrated in FIG. 6 may be employed.

In architecture 600, separate encoders are provided for each input modality. In the illustrated example, a text encoder 602 is configured to receive a text modality input 604. The text encoder may be implemented, for example, using contrastive language-image pre-training ("CLIP") as described in Radford, et al., "Learning Transferable Visual Models from Natural Language Supervision," arXiv: 2013.00020v1 (arXiv Feb. 26, 2021), the contents of which are hereby incorporated by reference as if entirely set forth herein. Other techniques may also be used. A segmentation encoder 606 is configured to receive a segmentation map modality input 608. A sketch encoder 610 is configured to receive a sketch modality input 612. The segmentation encoder and the sketch encoder may be implemented, for example, using convolutional networks with input skip connections. Other techniques may also be used. A style encoder 614 is configured to receive a style modality input 616. The style encoder may be implemented, for example, using a residual network. Other techniques may also be used. Each of the encoders produces a respective feature map 603, 607, 611, 615.

The feature maps are aggregated by a global product of experts net 620, the output of which is another feature vector 622. A decoder 618 is, in turn, configured to generate an output image 624 based on the feature vector 622 and on skip connections from the segmentation encoder and from the sketch encoder. (The skip connections are indicated in the drawing by left and right arrows entering decoder 618.) The global product of experts net and the decoder may be implemented, for example according to the techniques described by Huang, et al. Specifically, the global product of experts net may be configured to predict Gaussian distributions from the feature vectors of each input modality using a multilayer perceptron ("MLP"), and to compute a product distribution of the predicted Gaussian distributions. Another MLP may then be used to produce feature vector 622 using a sample from the product distribution. One technique for implementing decoder 618 is to use a stack of residual blocks as described by Huang, et al. Other techniques for implementing the global product of experts net and/or the decoder may also be used.

Example User Interfaces

User interfaces and related methods and structures will now be described that enable the synthesis of images with GNNs by using multiple distinct input modalities either separately or in combination. The use of such input modalities, in turn, enables greater flexibility, control and precision during the generation of synthetic images than has heretofore been available.

Figure 7:
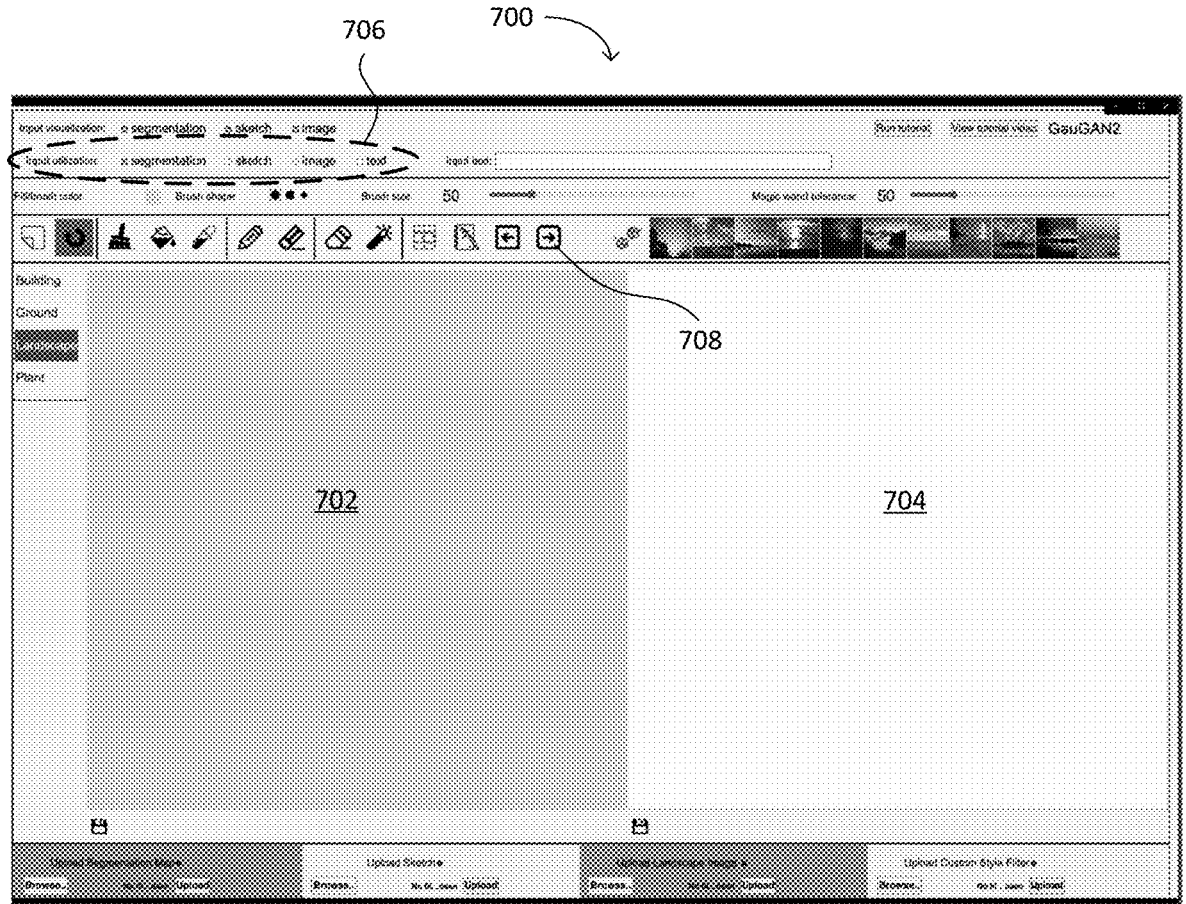
FIG. 7 illustrates an example user interface that enables a human user to create inputs in one or more different modalities and to generate an output image based on the created inputs.

FIG. 7 illustrates an example user interface 700 according to embodiments. The user interface includes an input area 702, an output area 704, and a set of choices 706 from which one or more input modalities may be selected. (Input modalities will be described in more detail below.) A user may create a set of inputs within the input area or elsewhere in the user interface in accordance with a currently selected set of input modalities. Once a suitable set of inputs has been created, an output generation command may be issued by clicking an output generation icon 708. One or more GNNs may be used to generate the output image responsive to the output generation command and based at least in part on the set of inputs present when the output generation command is issued. Once the image is generated, it may be presented in the output area of the user interface for review and assessment by the user, and potentially for further modification.

Input Modalities Generally: The phrase "input modality" as used herein refers to a mode of representation for one or more inputs that may be used to influence the generation of an output image. In the illustrated embodiment, four of such input modalities are provided for selection—a segmentation modality, a sketch modality, an image modality, and a text modality. In other embodiments, more or fewer than four modalities may be presented for selection, and different types of input modalities may be provided either in addition to or in lieu of the types illustrated.

In any embodiments, the modalities may be selected individually or in various combinations. For example, for embodiments in which four input modalities are presented for selection as in the illustrated embodiment, up to sixteen different combinations of input modalities may be indicated by a user. In embodiments that require at least one of the four input modalities to be selected, a total of fifteen combinations would be available for selection (excluding the all-null member in the full set of sixteen possible combinations). When more than one input modality is included in a selected combination, all of the corresponding inputs will influence the image that is generated responsive to issuance of the image generation command. The output image so generated will be based on a combination of the inputs corresponding to all of the selected input modalities. This may be accomplished, for example, using the architecture described above.

Using user interface 700, a user may indicate any desired combination of input modalities by selecting and/or unselecting check boxes located next the various choices, as shown. In other embodiments, different mechanisms or controls for selecting the input modalities may be provided in the user interface.

Figure 8:
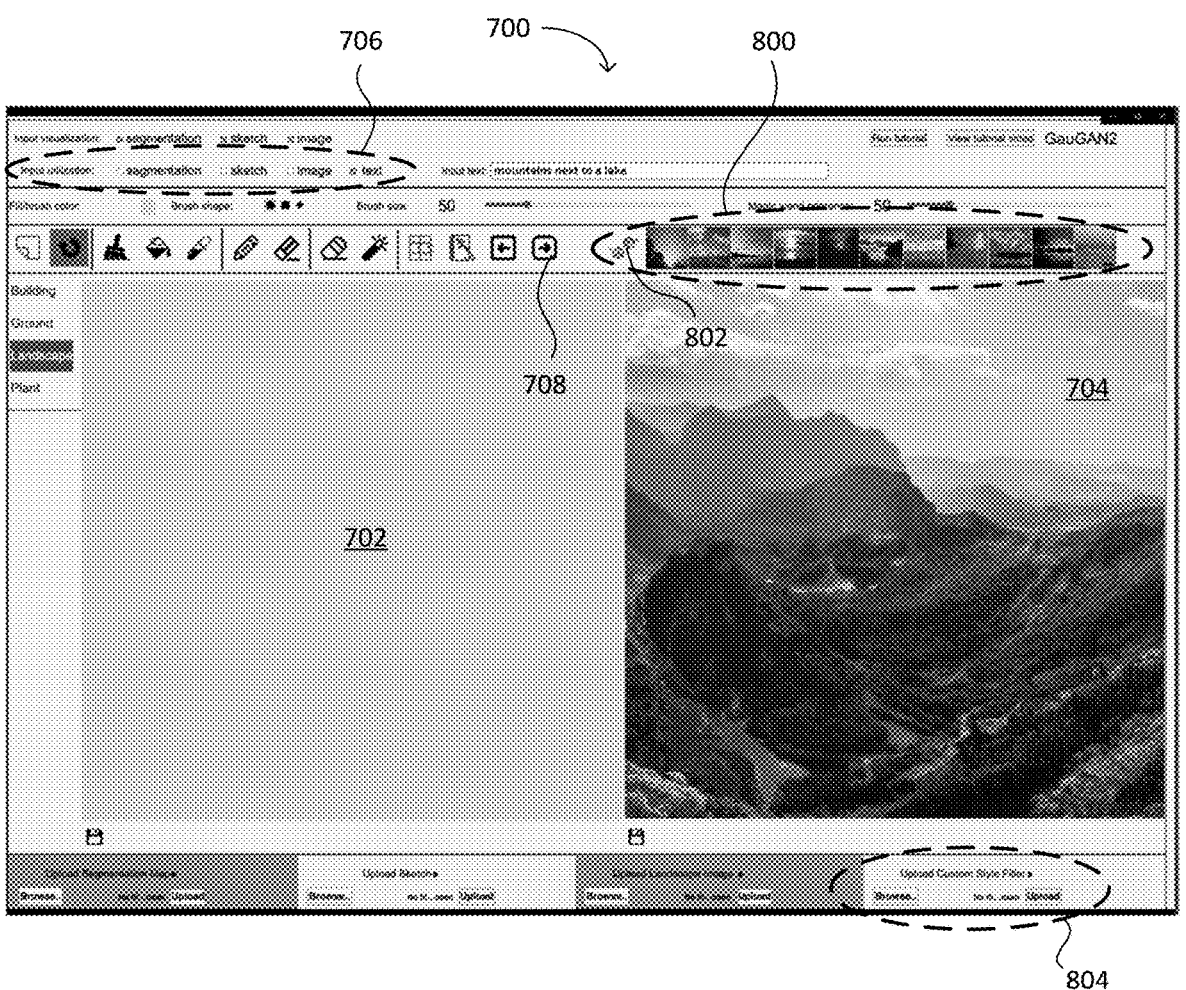
FIG. 8 illustrates a style modality input feature and a style upload feature of the user interface of FIG. 7.

Text Input Modality: A text input modality is one in which words or phrases are used as inputs to influence the generation of an output image. FIG. 8 illustrates such a text modality in operation. In the illustrated example, the check box located next to the text modality is selected, and the phrase "mountains next to a lake" is entered in the corresponding text box. After the text has been entered, an output generation command may be issued by clicking on the right arrow icon 708. Responsive to the output generation command, the input phrase is used to generate an output image that visually corresponds to the semantics of the input phrase. The output image is then presented in the output area 704 of the user interface for inspection by the user.

Style Modality: A set of images may be displayed in the user interface at area 800 to be used for style filter selection. If desired, once an output image has been generated, a user may click directly on any of the style filter images to select the corresponding filter and to generate a new output image based on the filter. The new output image so generated will correspond to the semantics of the original image (e.g., mountains next to a lake) but will be rendered in a style that is consistent with the selected style filter. Style filters may correspond, for example, to a time of day (e.g. daytime, evening or night), to a season (e.g. winter, spring, summer or fall), or to any of a wide variety of painting or illustration techniques such as oil or watercolor painting styles. Many other types of style filters are also possible. Moreover, additional style filters may be uploaded for use via style filter upload controls such as those located at area 804.

A random style selection option may also be presented. In the illustrated example, the random style selection option is presented in the form of dice icon 802. When the dice icon is clicked, a random style may be selected, and a new output image may be generated based on the random style. The random style may be selected, for example, from a set of styles corresponding to a training set on which the architecture was trained. Thus, the pool from which the random style is selected need not be limited to those displayed in style selection area 800. A new output image may be generated each time the dice icon is clicked.

Figure 9:
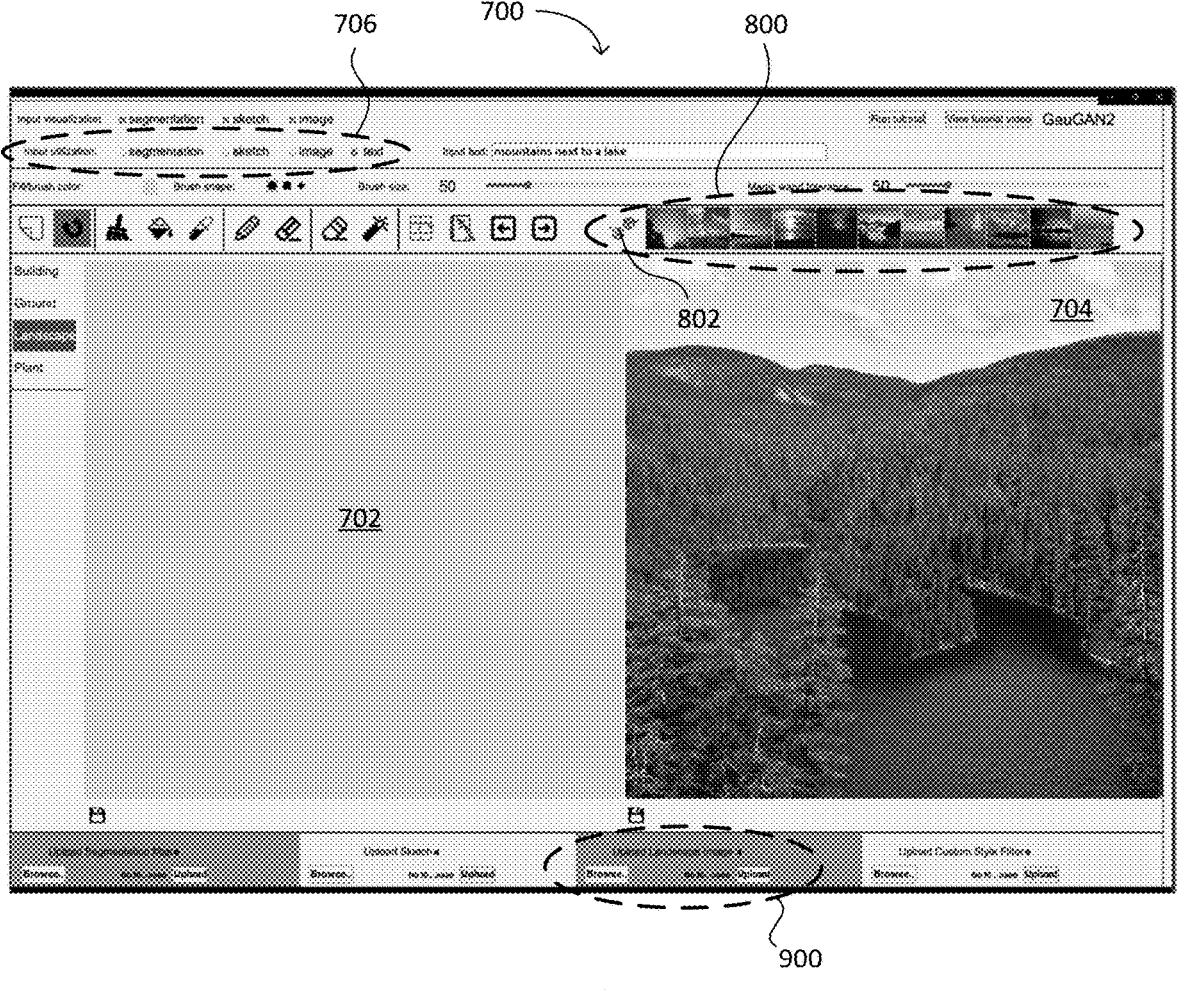
FIG. 9 illustrates an image upload feature of the user interface of FIG. 7.

FIG. 9 illustrates one possible result of selecting the dice icon. In the example of FIG. 9, the dice icon is clicked to issue a random style selection command after the mountain/lake scene of FIG. 8 has been generated. As can be seen in the output area of FIG. 9, a new output image is presented in the output area responsive to the random style selection command. The new output image corresponds semantically to "mountains next to a lake," but the style of the scene is altered relative to the style of the image of FIG. 8. As was described above, the random style selected by clicking the dice icon may be the same as one of the style images presented at area 800, or may be a different style that does not correspond to any of the example style images displayed.

Figure 10:
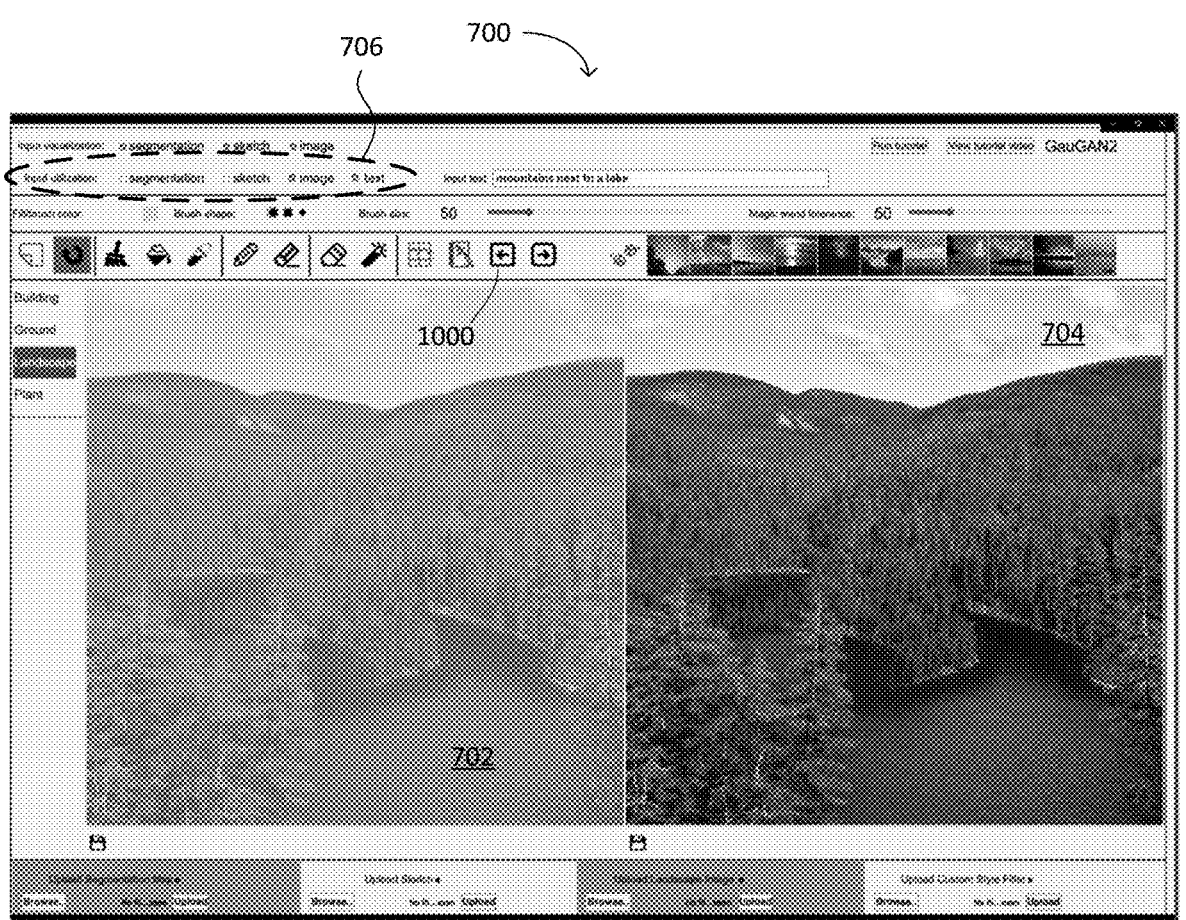
FIG. 10 illustrates an image modality input feature of the user interface of FIG. 7.

Image Input Modality: An image input modality is one in which an already-complete image is used as an input to influence the generation of a new output image. For example, when the image input modality is active, a generated image from output area 704 may be used as an input image for use when generating another output image, or an input image may be uploaded via the image upload controls located at area 900. The former case is illustrated in FIG. 10. In FIG. 10, an image copy command has been issued by clicking the left arrow icon located at 1000. The result of the image copy command is that the output image from output area 704 has been copied to the input area 702, as shown. In order to use the copied image as an input for the generation of a further output image, the image input modality is selected at area 706, also as shown. In the illustrated example, the text input modality remains selected, and the phrase "mountains next to a lake" remains in the input text box. Thus, both the image and the text will influence the output image generated. As was explained above, however, the image input modality could have been selected in isolation without the text input modality remaining selected, in which case only the input image would have influenced the generation of any new output image. When both of the input modalities are selected as in the illustrated example, both the input image and the phrase in the input text box will influence the generation of any new output image.

Figure 11:
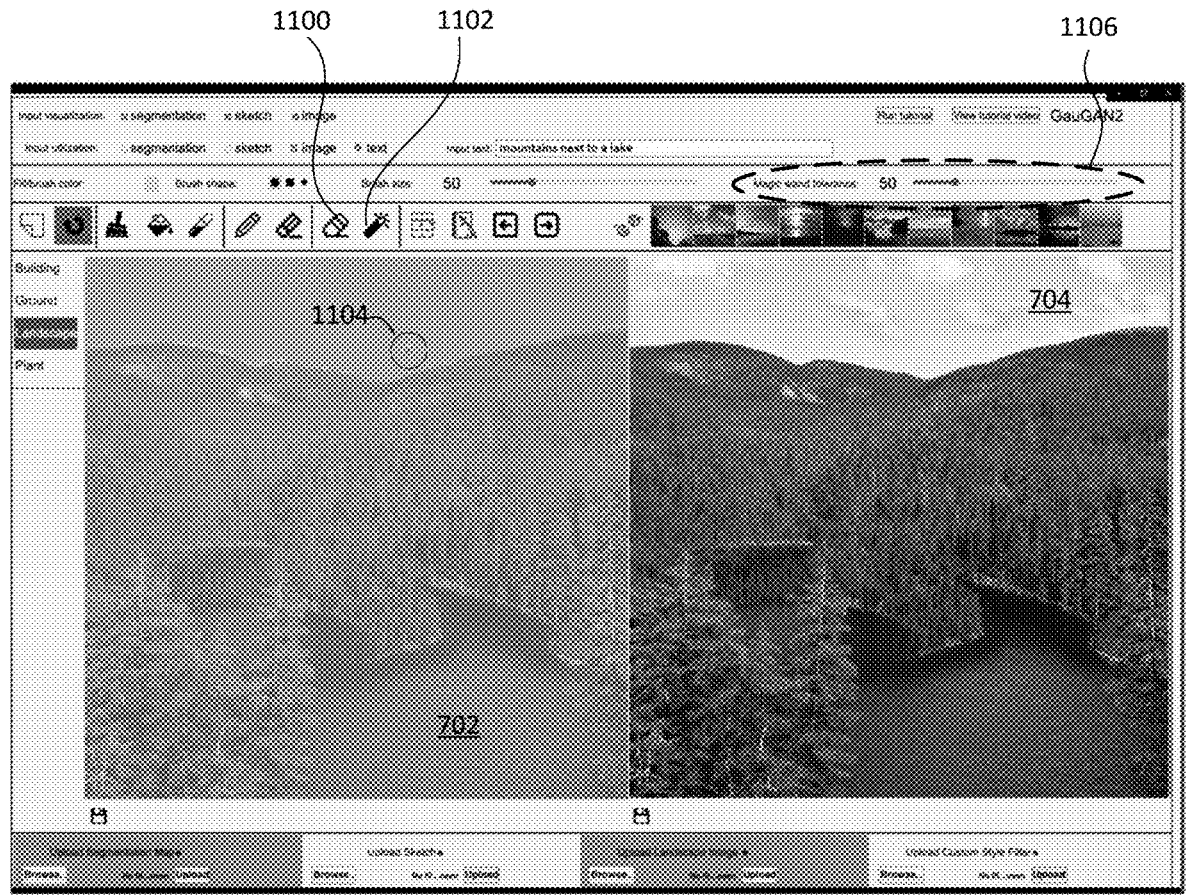
FIG. 11 illustrates an eraser feature and a magic wand feature of the user interface of FIG. 7.

Image Modification by Erasure: Once an input image has been placed into the input area, the input image may be modified prior to generating a new output image. By way of example, FIG. 11 illustrates elements of the sky area of an input image being erased by a user. An eraser tool 1100 and a "magic wand" tool 1102 may be provided for doing so. Either tool may be selected by clicking on its corresponding icon. Once selected, a visual representation of the corresponding tool is presented in input area 702. In the illustrated example, the selected tool is represented a circle 1104 superimposed onto the input image. When the eraser tool is employed, contents of the input image directly under the circle will be removed from the image. When the magic wand tool is selected, elements similar to the content under the circle will be removed from the image. For example, nearby pixels having a same or similar color to pixels under the circle can be erased, in addition to those pixels currently underneath the tool. Color similarity may be determine in a variety of ways, such as by similarity in the red, green, blue ("RGB") components of pixel colors. A control, such as slider 1106, may additionally be provided in the user interface to influence the impact of the magic wand tool. When a low tolerance level is indicated by the slider control, only elements that are very similar to the content under the circle will be removed from the image. When a higher tolerance level is indicated, similarity is defined more loosely such that more elements will be removed from the input image by the magic wand tool. For magic wand tools that operate on the basis of color, for example, the slider control may indicate a threshold degree of color similarity for nearby pixels to be erased. If desired, the spatial scope of pixels to be erased by the magic wand tool may be limited to an image segment in which the tool has been clicked. Such a segment may be computed automatically when the wand tool is applied to a point on the input image.

Segmentation Input Modality: Segmentation is another input modality that may be presented by the user interface to enable a user to define inputs for the image generator and thereby to influence how the output image is generated. In general, a segmentation map is a partition of a plane into two or more segments. In the case of a two-dimensional input image, a segmentation map partitions the image into two or more segments. For example, a segmentation map may be used to partition an image according to its subject matter such that regions of the image corresponding to one type of subject matter are mapped to one segment of the segmentation map, while regions of the image corresponding to another type of subject matter are mapped to another segment of the segmentation map. One or more trained neural networks may be used to compute a segmentation map over a given input image, and different neural networks may be trained for different input image types. For example, one neural network may be trained to segment a landscape image, another to segment an image of a human face, and so on. Depending on which type of image is being presented in the input area of the user interface, a corresponding neural network may be invoked to generate a segmentation map for that input image.

Figure 12:
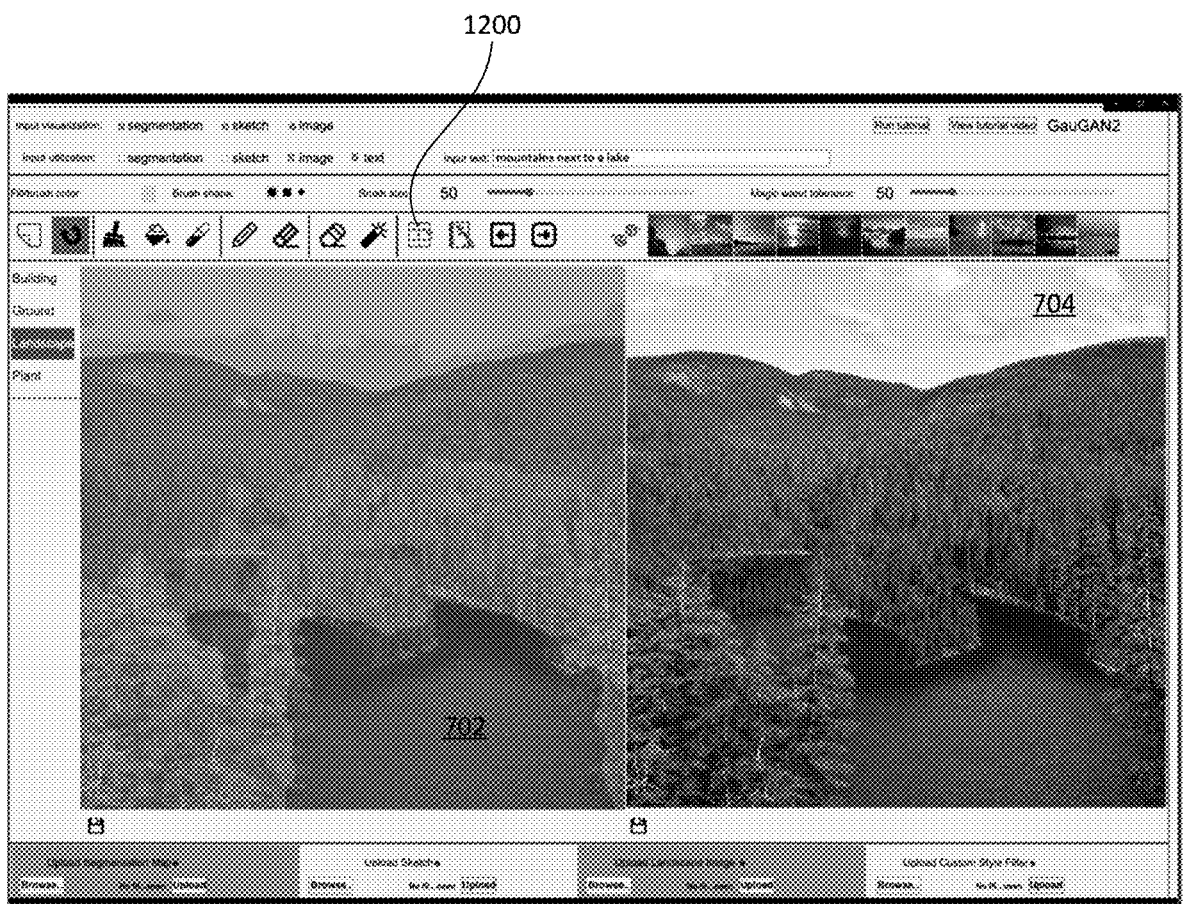
FIG. 12 illustrates a segmentation modality input feature of the user interface of FIG. 7.

To enable the use of segmentation as an input modality, the user interface may provide a control for generating a segmentation map of an existing input image. In the example illustrated by FIG. 12, a puzzle icon 1200 is provided for this purpose. Once the puzzle icon is clicked, the image that was present in input area 702 has a corresponding segmentation map visually superimposed thereon, as illustrated, for example by using different colors to represent different segments. Such a segmentation map may represent semantically similar elements in the image (e.g. water) with similar coloring and may represent semantically different elements in the image (e.g. nearby trees versus distant trees) with different coloring. Any one segment may be spatially contiguous or may be spatially disjoint.

Figure 13:
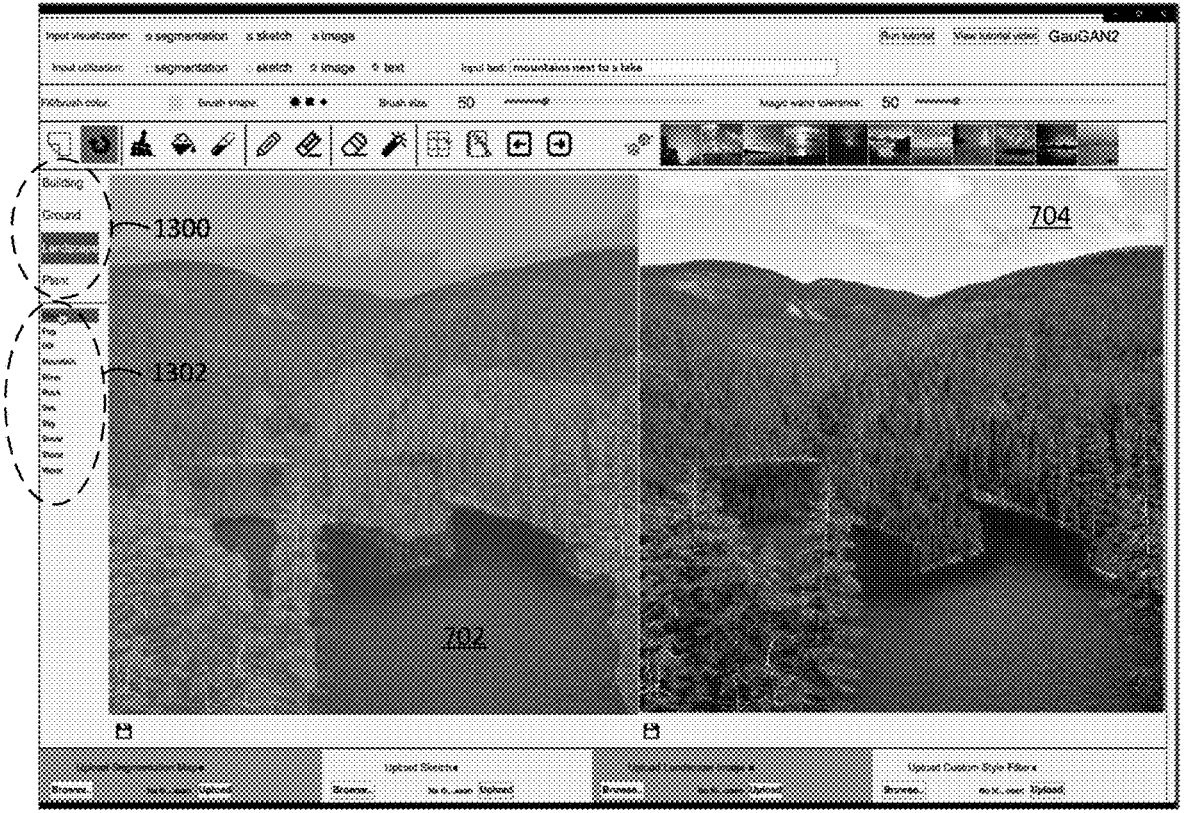
FIG. 13 illustrates menus suitable for use with the segmentation modality input feature of FIG. 12.

The segmentation map may be used to design further inputs for image generation. By way of example, as illustrated in FIG. 13, the user interface may present one or more menus of subject matter types that may be selected and assigned to a segment that is visually represented in the segment map, or to portions of a segment. In the illustrated example, a top level menu 1300 enables selection of a broad class of subject matter types (e.g., building, ground, landscape, and plant). Based on the broad class selected in the top level menu, a submenu 1302 enables selection from among finer classes of subject matter types (e.g., fog, hill, mountain, river, rock, sea, sky, snow, stone, or water).

Figure 14:
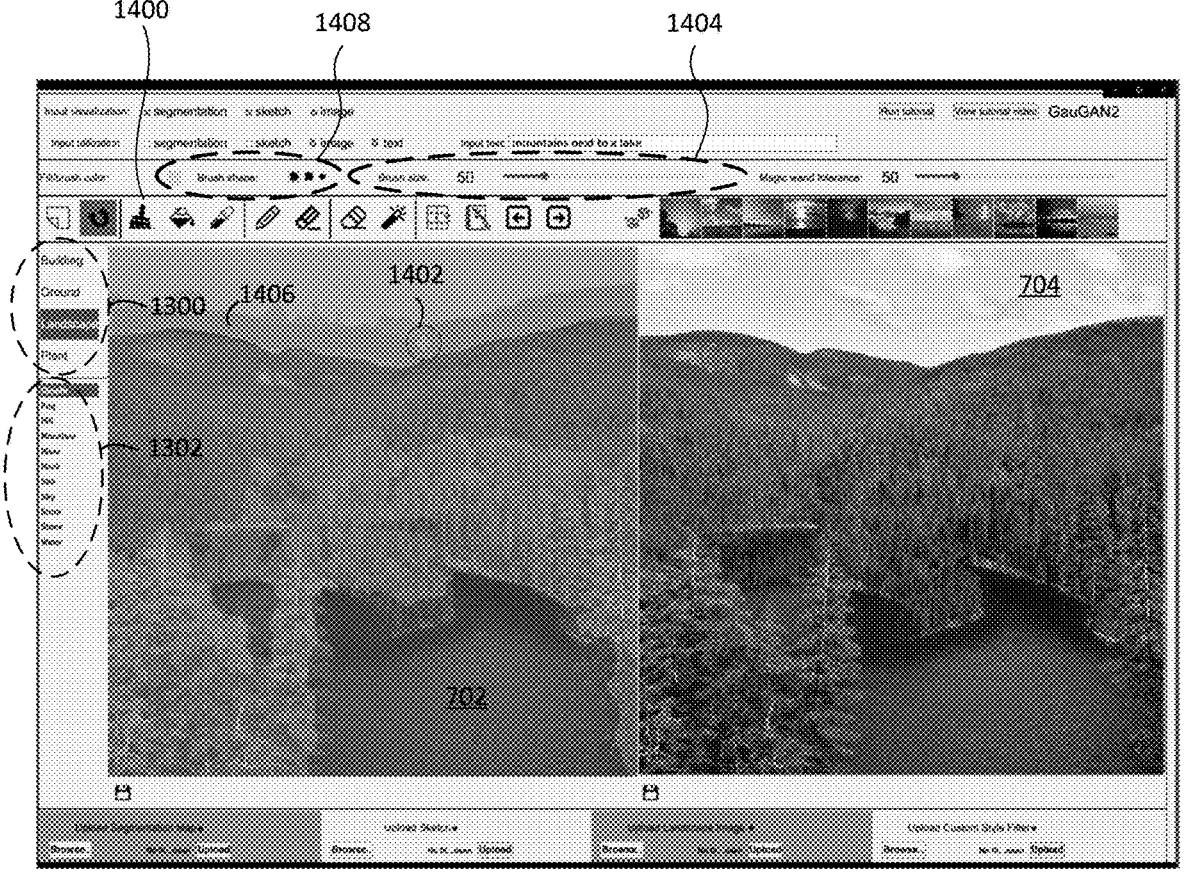
FIG. 14 illustrates a paint brush tool suitable for use with the segmentation modality input feature of FIG. 12.

Paint Brush Tool: Referring now to FIG. 14, once a subject matter type has been selected from menus 1300, 1302, a paint brush tool (represented in the example by icon 1400) may be selected to apply a corresponding subject matter type assignment to an area of a segment in the input image. The brush itself may be represented with a visual indicator superimposed onto the input image (e.g., by a circle 1402 as shown). The width of the paint brush tool may be modified, if desired, via a brush size control provided by the user interface, such as brush size slider 1404. In addition, the shape of the visual indicator that represents the paint brush may be modified, if desired, via a brush shape control provided by the user interface, such as brush shape selector 1408. In the example of FIG. 14, the paint brush tool is being used to assign a "landscape/clouds" subject matter type to a region of the sky portion of the segmentation map just above the hills. The effect of the assignment is shown as an altered color 1406 within the segmentation map. In effect, the pain brush tool may be used to create a new segment in the displayed segmentation map. The new segment created by the tool will correspond to the areas "brushed" by the tool, and will be assigned the subject matter type currently associated with the brush.

Figure 15:
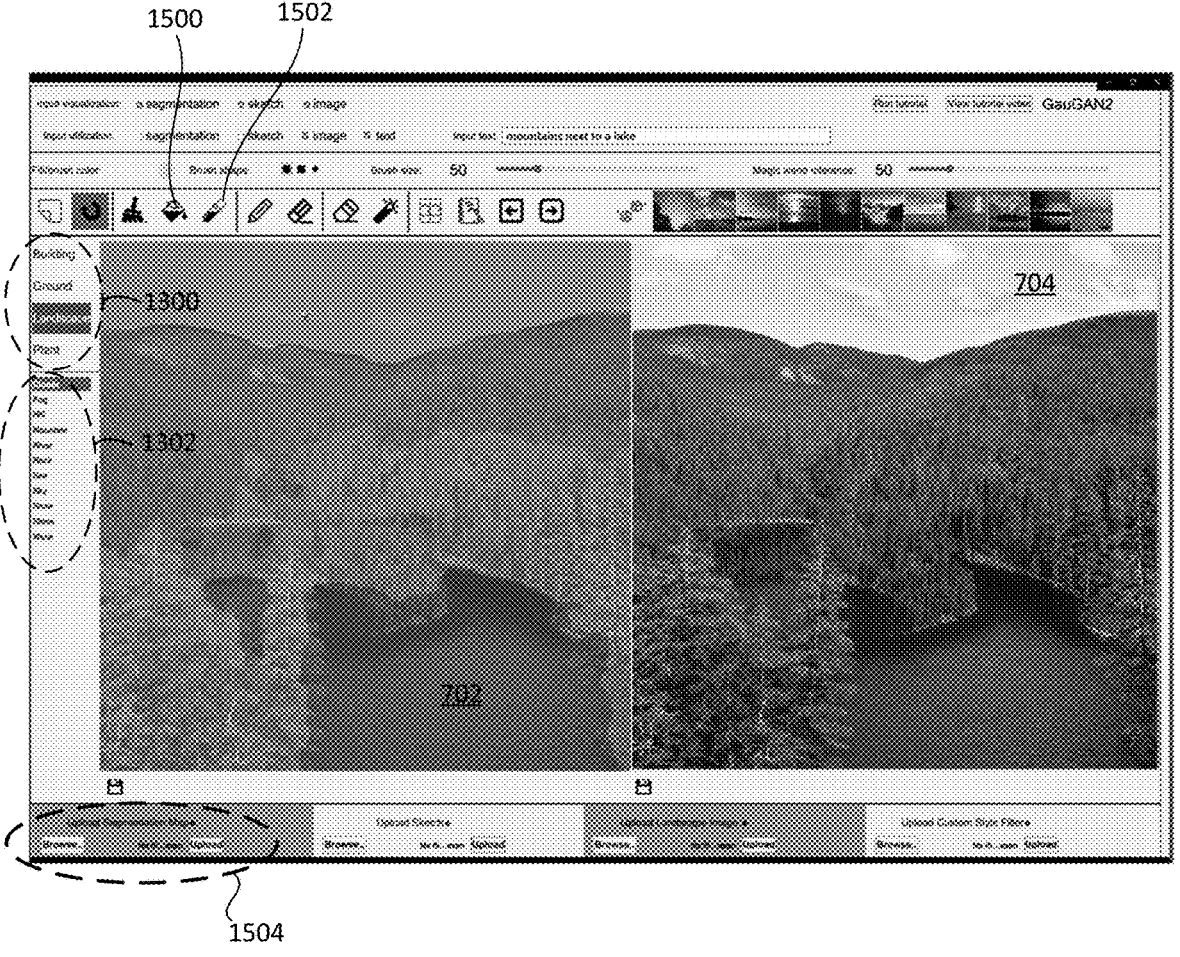
FIGS. 15-17 illustrate paint bucket and dropper tools suitable for use with the segmentation modality input feature of FIG. 12.

Paint Bucket Tool: Referring now to FIG. 15, the user interface may also provide a tool for assigning a subject matter type to an entire segment of the input image. In the illustrated example, such a tool is represented by paint bucket icon 1500. FIG. 15 illustrates a case in which the paint bucket tool has been used to click the sky segment of the input image. The result is that all areas of the segmentation map corresponding to the semantic of "sky" have been colored with the subject matter type "landscape/clouds" selected by means of menu 1300 and submenu 1302 and associated with the paint bucket tool. By way of contrast with the pain brush tool, which creates a new segment in the segmentation map, the paint bucket tool assigns a designated subject matter type to an existing segment by using the tool to click on the segment.

Dropper Tool: The user interface may also provide a tool for selecting a subject matter type from the segmentation map itself instead of from menus 1300, 1302. In the illustrated example, such a tool is represented by dropper icon 1502. Once activated, the dropper tool may be used to select a subject matter type by clicking on a first segment of the segmentation map, thereby selecting the subject matter type currently assigned to that segment, and then to assign the subject matter type to another segment of the image by clicking on a second segment of the map. The result will be that the subject matter type of the first segment is assigned to the second segment also.

In lieu of, or in addition to, modifying an existing segmentation map as described above, a user may upload a segmentation map to the input area via segmentation map upload controls such as those located at area 1504.

Figure 16:
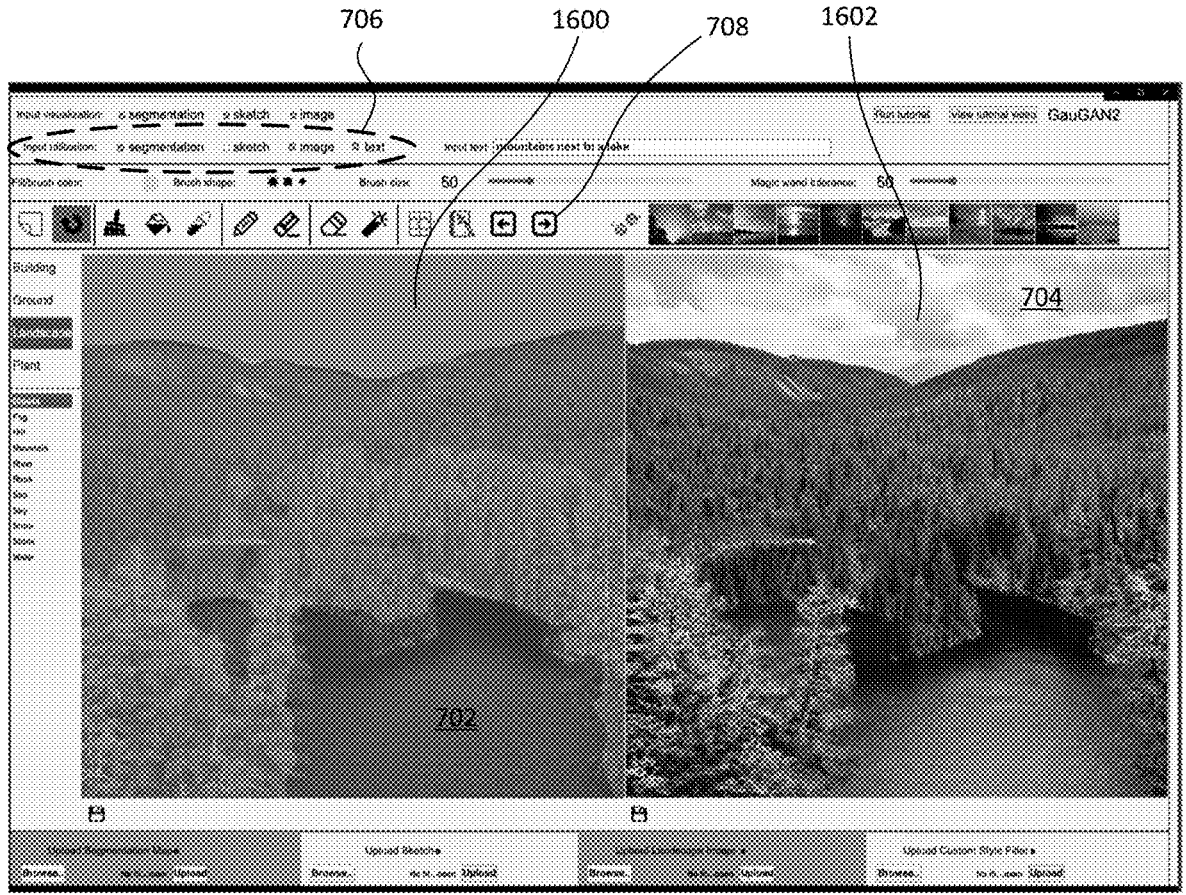

Referring now to FIG. 16, a user may select the segmentation input modality in area 706 to enable the current segmentation map, however generated, to influence the generation of a new output image along with all of the inputs corresponding to any other currently selected input modalities. In the example of FIG. 16, a combination of the paint brush, paint bucket and dropper tools have been used to assign the "landscape/clouds" subject matter type to area 1600 of the segmentation map. The segmentation input modality is selected in area 706, and the output generation command is issued by clicking on output generation icon 708. The result is that the corresponding area 1602 of the output image is substantially filled with clouds. (Compare the output image of FIG. 16 with the output image of FIG. 15, in which the sky area is only partly cloudy.)

Figure 17:
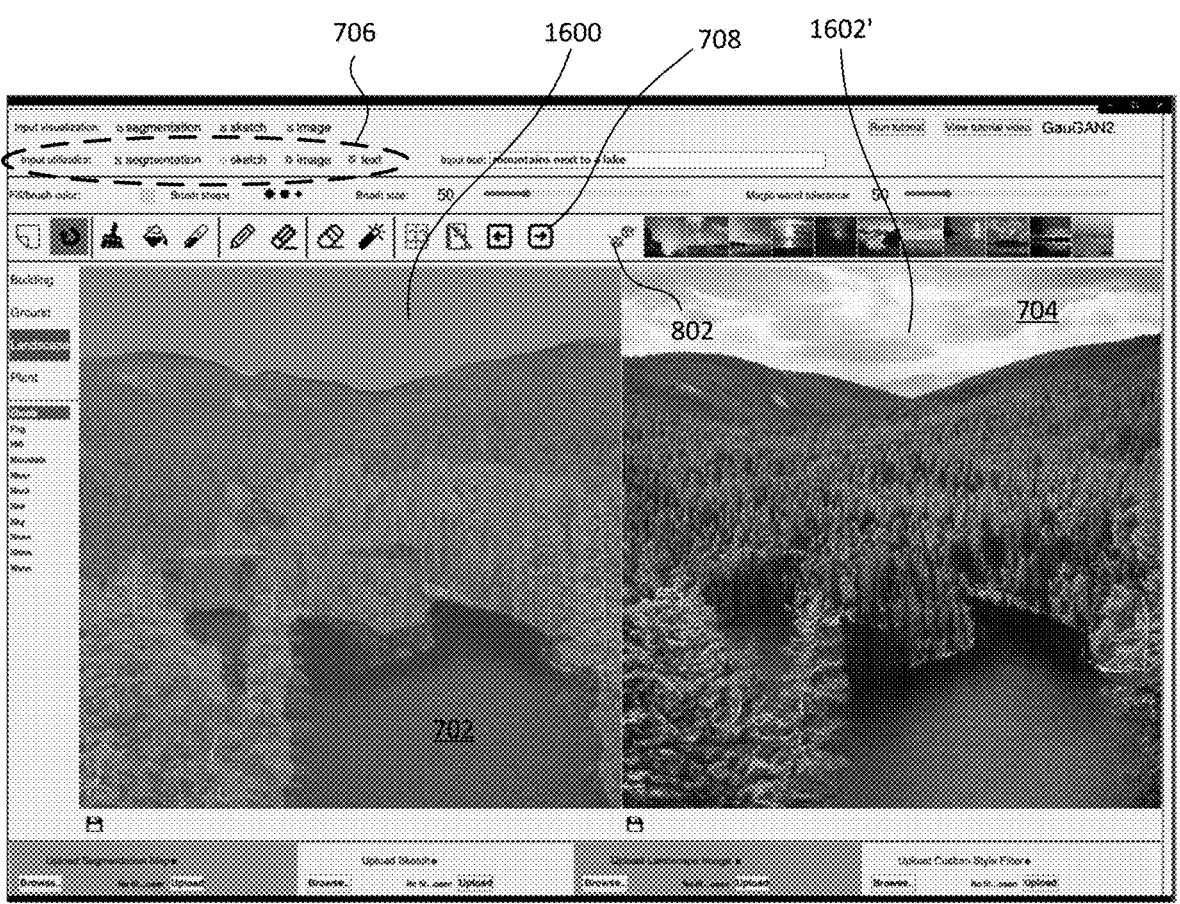

Referring now to FIG. 17, the user may then click the dice icon 802 again, if desired, to produce an alternative image based on the same input modalities (segmentation, image, and text) that were used to generate the image of FIG. 16. As can be seen in the view of FIG. 17, a similar image has been produced, but with some differences. For example, the cloud-filled sky 1002' in FIG. 17 has different characteristics relative to the cloud-filled sky 1002 of FIG. 16, and the snowy and bare areas in the distant hills have been modified.

Figure 18:
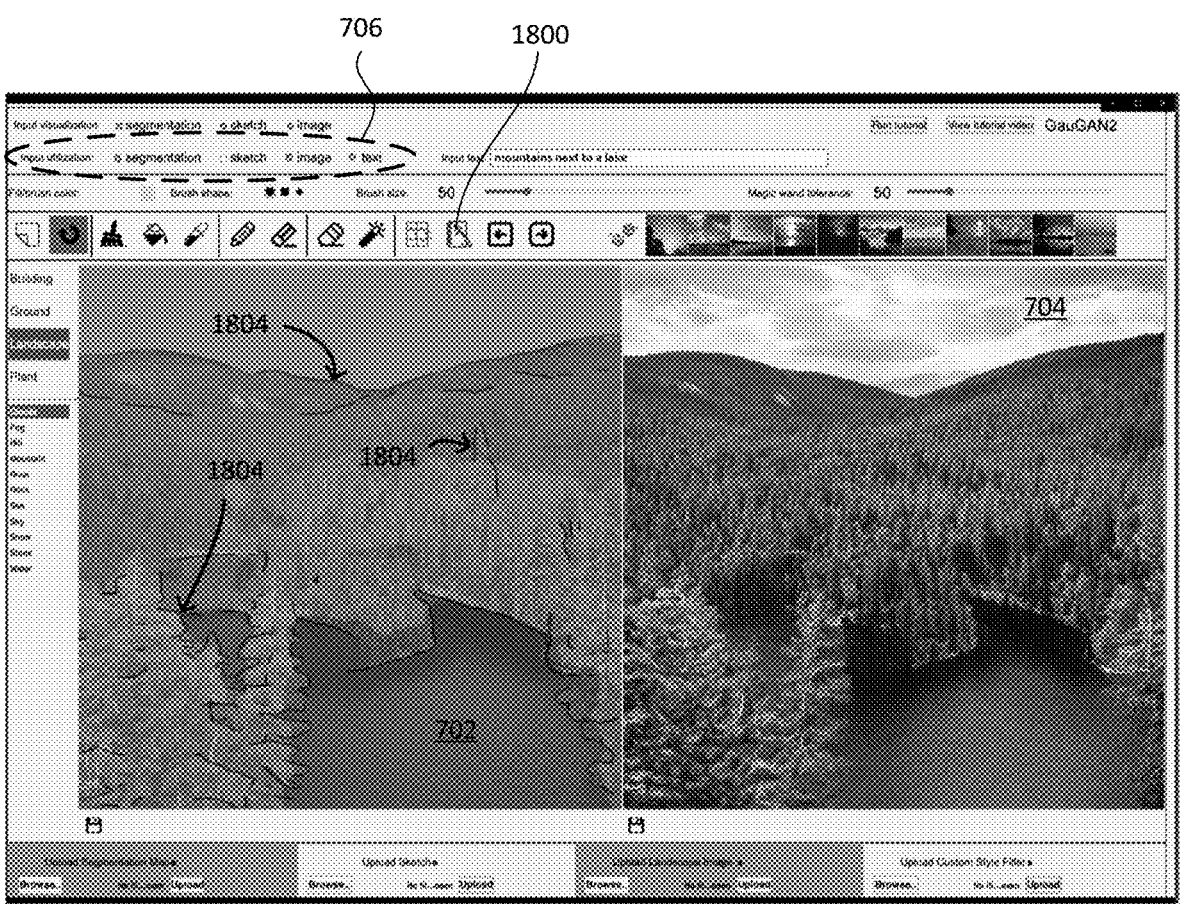
FIG. 18 illustrates an edge map computation feature of the user interface of FIG. 7.

Edge Computation: Referring now to FIG. 18, the user interface may also present a tool for computing edges that are present in an image that is currently displayed in the input area. In the illustrated embodiment, clicking the jagged line icon 1800 issues a command to the image generator to compute the edges present in the input image and to superimpose them onto the input image. FIG. 18 illustrates the user interface as it would appear after the edge computation command has been issued by clicking the edge computation tool 1800. As can be seen in the figure, various edges 1804 have been generated and appear superimposed onto the input image.

Sketch Input Modality: A sketch input modality is one in which a set of one or more lines or curves may be used as an input to influence the generation of a new output image. The user interface may present a control for enabling a sketch input modality, such as the sketch check box located in area 706.

Figure 19:
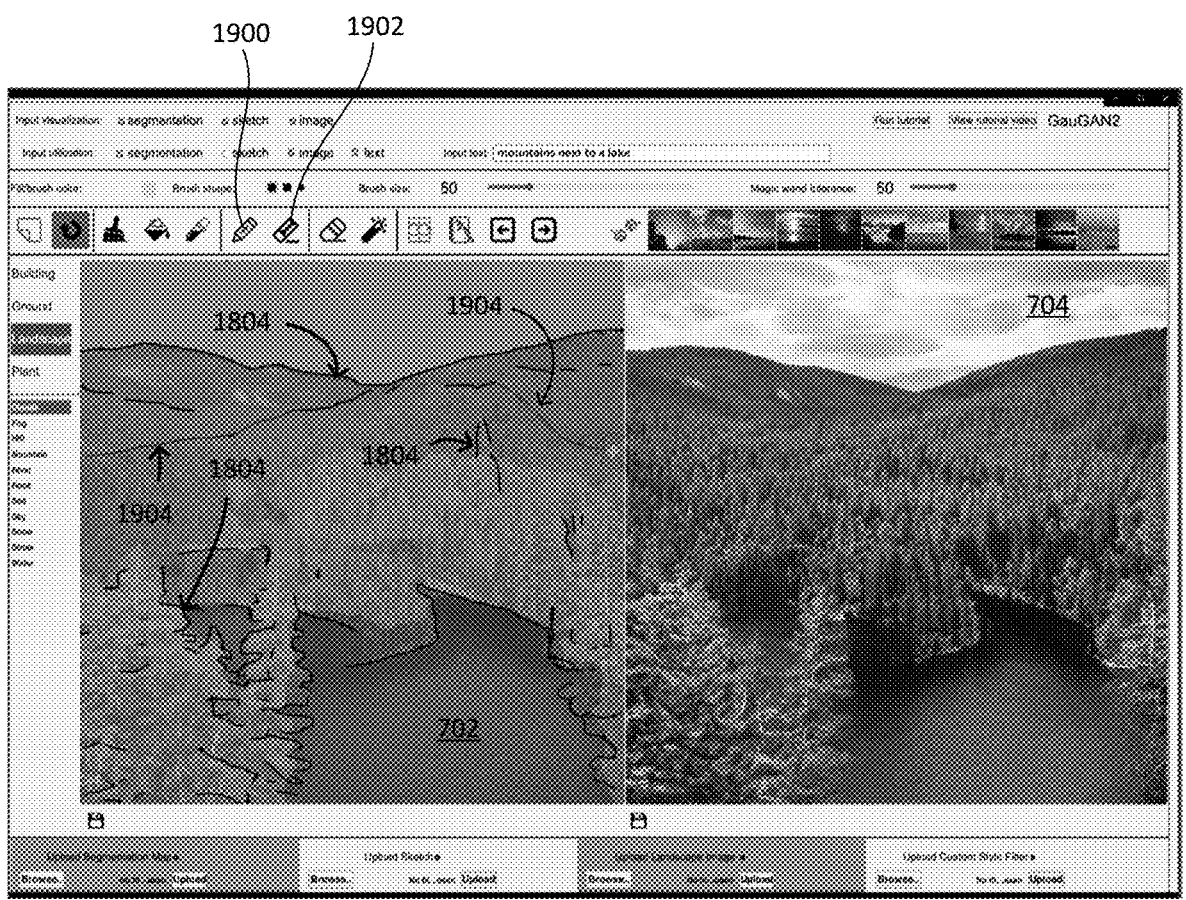
FIGS. 19-20 illustrate a sketch modality input feature of the user interface of FIG. 7.

In general, sketching may be used to augment or to otherwise modify a computer-generated edge map such as the one described above, or it may be used independently of a computer-generated edge map. By way of example, and referring now to FIG. 19, the user interface may present various controls such as a sketch pencil tool 1900 or a pencil eraser tool 1902 for creating or modifying lines and curves on an input image. FIG. 19 illustrates the user interface as it would appear after the sketch pencil tool has been used to manually augment the existing computer-generated edges 1804 with several new lines 1904.

Figure 20:
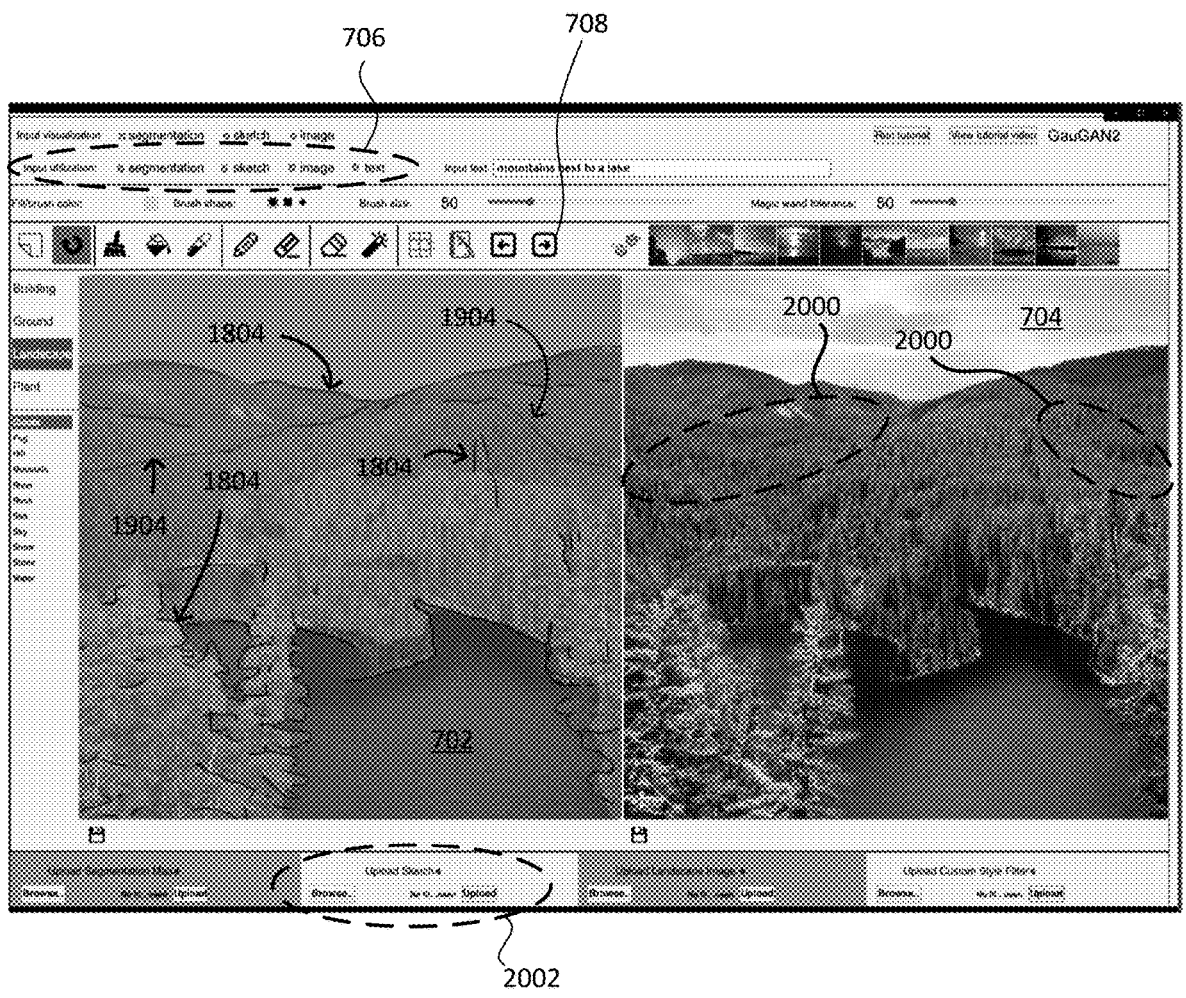

After the sketched lines have been created, the sketch input modality may be selected and a new output image may be generated that is influenced by the edges represented in the input sketch. FIG. 20 illustrates the user interface as it would appear, for example, after the sketch input modality has been selected at 706 and the output generation icon has been clicked at 708. As can be seen in the new output image, new features 2000 have appeared in the landscape in output area 704. The new features correspond to the new edges 1904 present in the sketch shown in input area 702.

In lieu of, or in addition to, manually creating a set of lines or modifying an existing set of lines to produce an input sketch, an arbitrary set of lines may be uploaded via sketch upload controls such as those located at area 2002.

Figure 21:
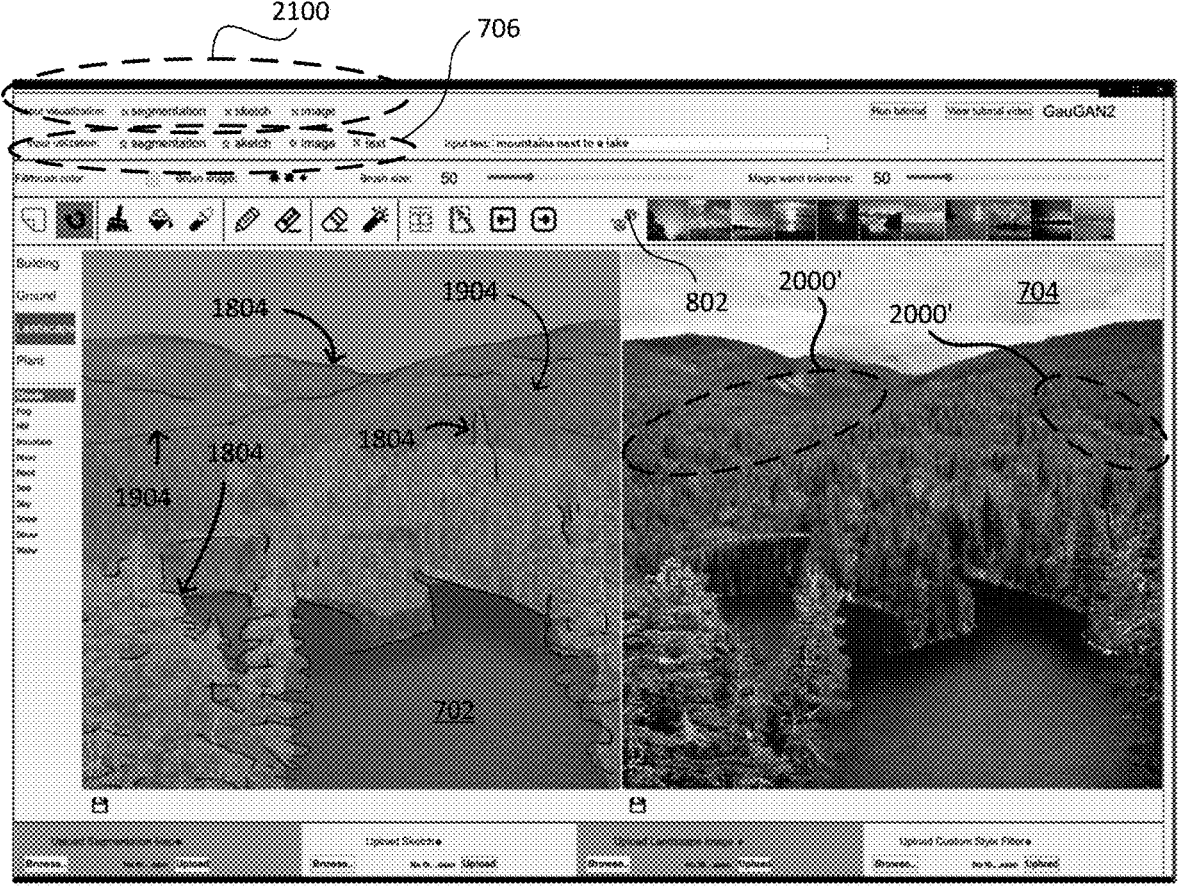
FIG. 21 illustrates an input modality layers feature of the user interface of FIG. 7.

Referring now to FIG. 21, yet another variation of the same scene may be generated by clicking the dice icon 802. As can be seen in the resulting image, the landscape has been modified relative to that in FIG. 20, and yet all of the inputs corresponding to the active modalities specified at 706 have influenced the new output image, as intended. Features 2000' remain in the output image of FIG. 21, for example, and correspond to the features 2000 of FIG. 20.

Input Layers: As FIG. 21 also illustrates, the user interface may present a set of controls for indicating which of the input modalities should be displayed in input area 702 at any given time. In the illustrated example, the check box controls at area 2100 may be used for this purpose. Using this set of controls, a user may indicate that only the segmentation map should be displayed in the input area, or only the sketch inputs, or only the input image, or any combination of these. Although all modalities enabled by check boxes 706 will affect the generation of the output image, only the input modalities selected by check boxes 2100 will be displayed in input area 702. In this manner, a user may choose to work with only a subset of the enabled input modalities at a time, so as not to overly clutter or confuse the input area.

Locations and Relative Positions of Displayed Elements

The locations and relative positions of the displayed elements illustrated herein are provided by way of example and not by way of limitation. In some embodiments, the locations or the relative positions of the elements may differ from the illustrated embodiments or may be varied according to a user's selections (such as, for example, by displaying the elements within separate windows and allowing the user to rearrange and/or resize the windows). In other embodiments, some of the displayed elements may be omitted and others may be added. In still further embodiments, some of the displayed elements may be displayed in a first geographic location while the same or others of the displayed elements may be displayed in one or more remote geographic locations, enabling multiple users to collaborate in the generation of one or more inputs or one or more output images.

Processing Locations

Similarly, in any of the embodiments described herein, processing steps need not all be performed in a same physical location, and elements of processing hardware need not all be located in a same physical location. In some embodiments, for example, user interface elements may be displayed in one or more first locations, while output image generation or other processing steps may be performed in one or more second locations distinct from the first locations. In still further embodiments, the user interface may be displayed within a web browser at a first location, and the generation of the output image may be performed by a web server computer at a second location remote from the first location. In this way, a less capable computing device may be used to present the user interface, while a more capable computing device (such as one that contains one or more graphics processing units and sufficient memory to implement architecture 600 described above) may be used to generate the output image. Once generated, the output image may be transferred to the first location using a suitable network protocol such as, for example, HTTP or HTTPS.

Example Computing Devices

FIG. 22 is a block diagram illustrating various computing devices that may be used to perform any of the methods or to implement any of the structures and/or user interfaces described above. The computing devices illustrated are provided by way of example and not by way of limitation. Persons having skill in the art and having reference to this disclosure will appreciate that alternative or additional types of computing devices may also be employed in conjunction with any of the embodiments described herein.

Computer system 2200 includes one or more central processor unit ("CPU") cores 2202 coupled to a system memory 2204 by a high-speed memory controller 2206 and an associated high-speed memory bus 2207. System memory 2204 typically comprises a large array of random-access memory locations, often housed in multiple dynamic random-access memory ("DRAM") devices, which in turn may be housed in one or more dual inline memory module ("DIMM") packages. Each CPU core 2202 is associated with one or more levels of high-speed cache memory 2208, as shown. Each core 2202 can execute computer-readable instructions 2210 stored in the system memory, and can thereby perform operations on data 2212, also stored in the system memory.

The memory controller is coupled, via input/output bus 2213, to one or more input/output controllers such as input/output controller 2214. The input/output controller is in turn coupled to one or more tangible, non-volatile, computer readable media such as computer-readable medium 2216 and computer-readable medium 2218. Non-limiting examples of such computer-readable media include so-called solid-state disks ("SSDs"), spinning-media magnetic disks, optical disks, flash drives, magnetic tape, and the like. The storage media may be permanently attached to the computer system or may be removable and portable. In the example shown, medium 2216 has instructions 2217 (software) stored therein, while medium 2218 has data 2219 stored therein. Operating system software executing on the computer system may be employed to enable a variety of functions, including transfer of instructions 2210, 2217 and data 2212, 2219 back and forth between the storage media and the system memory.

The memory controller is also coupled to a graphics subsystem 2226 by a second high-speed memory bus 2224. The graphics subsystem may, in turn, be coupled to one or more display devices 2228. While display devices 2228 may be located in physical proximity to the rest of the components of the computer system, they may also be remotely located. Software running on the computer system may generate instructions or data that cause graphics subsystem to display any of the example user interface elements described above on display devices 2228. Such software may also generate instructions or data that cause the display of such elements on one or more remotely located display devices (for example, display devices attached to a remotely located computer system) by sending the instructions or data over network 2222 using an appropriate network protocol. The graphics subsystem may comprise one or more graphics processing units ("GPUs") to accelerate the execution of instructions or to implement any of the methods described above.

Computer system 2200 may represent a single, stand-alone computer workstation that is coupled to input/output devices such as a keyboard, pointing device and display. It may also represent one of the nodes in a larger, multi-node or multi-computer system such as a cluster, in which case access to its computing capabilities may be provided by software that interacts with and/or controls the cluster.

Nodes in such a cluster may be collocated in a single data center or may be distributed across multiple locations or data centers in distinct geographic regions. Further still, computer system 2200 may represent an access point from which such a cluster or multi-computer system may be accessed and/or controlled. Any of these or their components or variants may be referred to herein as "computing apparatus," a "computing device," or a "computer system."

In example embodiments, data 2219 may correspond to inputs represented in any of various modalities, or may correspond to output images, or both, and instructions 2217 may correspond to algorithms or executable instructions for performing any of the methods described herein. In such embodiments, the instructions, when executed by one or more computing devices such as one or more of the CPU cores, cause the computing device to perform operations described herein on the data, producing results that may also be stored in one or more tangible, non-volatile, computer-readable media such as medium 2218. The word "medium" as used herein should be construed to include one or more of such media.

Any of the user interfaces described above and any of the functional or structural blocks described above in relation to block diagrams or flow diagrams may be implemented as one or more modules. In some embodiments a single such module may implement more than one of the described functional blocks. In other embodiments more than one module may together implement a single functional block. Any or all of such modules may be implemented by using appropriate software, or by using special purpose hardware designed to perform the indicated functions, or by using a combination of these.

CONCLUSION

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions, locations or groupings, and some components may be omitted, while other components may be added, except where the context clearly indicates otherwise. The scope of the disclosure is intended to include all such combinations, modifications, and generalizations as well as their equivalents.

What is claimed is:

1. A system, comprising:
one or more processors;
one or more display devices; and
one or more memories storing instructions that, when executed by the one or more processors, cause the display of a user interface on the one or more display devices, wherein the user interface comprises:
two or more input generation tools, each corresponding to one of a plurality of distinct input modalities and each operable to generate a user input having an associated user input graphical indication;
at least one input area operable to display the user input graphical indications associated with a visualized subset of generated user inputs;

an output area distinct from the input area and operable to display an output image that is based on a utilized subset of the generated user inputs;
at least one input utilization control distinct from the input generation tools, comprising a displayed collection of input modality descriptors and operable to enable a user to determine the utilized subset by selecting one or more of the input modality descriptors in the displayed collection of input modality descriptors and thereby to indicate which ones of the generated user inputs should influence the output image; and
at least one input visualization control distinct from the input generation tools and distinct from the input utilization control and operable to determine the visualized subset by selecting which ones of the generated user inputs should have their graphical indications displayed in the input area;
wherein the selection of which ones of the generated user input graphical indications should be displayed in the input area is independent of the selection of which ones of the generated user inputs should influence the output image.

2. A system according to claim 1, wherein:
the input modalities comprise a segmentation input modality.

3. A system according to claim 1, wherein:
the input modalities comprise a sketch input modality.

4. A system according to claim 1, wherein:
the input modalities comprise an image input modality.

5. A system according to claim 1, wherein:
the input modalities comprise a text input modality.

6. A system according to claim 1, wherein:
the input utilization control enables determining the utilized subset by selecting any subset of input modality descriptors from the displayed collection of input modality descriptors.

7. A system according to claim 1, wherein the user interface further comprises:
a set of controls operable to apply a style filter during generation of the output image.

8. A system according to claim 7, wherein:
the set of controls operable to apply a style filter offers a random style filter to be applied during generation of the output image.

9. A system according to claim 1, wherein the user interface further comprises:
a control operable to copy an output image from the output area into the input area.

10. A system according to claim 1, wherein the user interface further comprises:
a set of controls operable to enable uploading inputs that correspond to one or more of the input modalities.

11. A system according to claim 1, wherein the user interface further comprises:
a set of controls operable to enable modifying an input image, displayed in the input area, using one or more of the input modalities.

12. A system according to claim 1, wherein:
the display device is disposed at a first location; and
the output image is generated at a second location remote from the first location.

13. A system according to claim 12, wherein:
the user interface is displayed within a web browser disposed at the first location; and
the output image is generated by a web server disposed at the second location.

14. A system according to claim 1 wherein:

the input visualization control enables the user to determine the visualized subset by selecting any subset of input modality descriptors from an offered collection of two or more input modality descriptors.

15. A system according to claim 1, wherein:

at least one of the input modality descriptors comprises a textual description of a respective one of the distinct input modalities.

16. A method, comprising:

displaying a user interface on at least one display device, wherein the user interface comprises:

at least one input area operable to display graphical indications that represent one or more user generated inputs, wherein each user generated input corresponds to one of two or more distinct input modalities and is generated with one or more selectable input generation tools;

an output area operable to display an output image generated based on a utilized subset of the one or more user generated inputs; and at least one input utilization control, distinct from the input generation tools, comprising a first displayed set of input modality descriptors and operable to enable a user to determine the utilized subset by selecting any combination of the input modality descriptors from the first displayed set and thereby to indicate which ones of the generated user inputs should influence the output image;

wherein the input modalities comprise:

a segmentation input modality in which the input area may be partitioned into one or more segments; and a sketch input modality in which lines or curves may be drawn in the input area;

wherein the lines or curves drawn with the sketch input modality need not partition the input area, such that the sketch input modality and the segmentation input modality are distinct input modalities.

17. A method according to claim 16, wherein:

the input modalities comprise an image input modality.

18. A method according to claim 16, wherein:

the input modalities comprise a text input modality.

19. A method according to claim 16, wherein the user interface further comprises:

at least one input visualization control, distinct from the input generation tools and distinct from the input utilization control, and operable to determine which ones of the graphical indications should be displayed in the input area by enabling individual selection of any combination of input modality descriptors from a second displayed set of input modality descriptors.

20. A method according to claim 16, wherein the user interface further comprises:

a set of controls operable to apply a style filter during generation of the output image.

21. A method according to claim 16, wherein the user interface further comprises:

a control operable to copy an output image from the output area into the input area.

22. A method according to claim 16, wherein the user interface further comprises:

a set of controls operable to enable modifying an input image, displayed in the input area, using any of the one or more input modalities.

23. A method according to claim 16, wherein:

the user interface is displayed within a web browser disposed at a first location; and the output image is generated by a web server disposed at a second location remote from the first location.

24. A method according to claim 16, wherein:

the input modalities further comprise an image input modality and a text input modality;

when more than one of the input modalities are selected by the input utilization control, a user generated input corresponding to each selected input modality influences generation of the output image; and the user interface comprises one or more controls enabling a human user to modify an input image, displayed in the input area, using selected ones of the one or more input modalities.

25. A method according to claim 16, wherein:

at least one of the input modality descriptors comprises a textual description of a respective one of the distinct input modalities.

26. A non-transitory computer-readable medium having instructions stored therein that, if executed by one or more processors in one or more computing devices, cause the computing devices to perform steps comprising:

displaying a user interface on one or more display devices, wherein the user interface comprises:

two or more input generation tools, each corresponding to one of a plurality of distinct input modalities and each operable to generate a user input having an associated user input graphical indication;

at least one input area operable to display the user input graphical indications associated with a visualized subset of generated user inputs;

an output area distinct from the input area and operable to display an output image that is based on a utilized subset of the generated user inputs;

at least one input utilization control, distinct from the input generation tools, comprising a displayed collection of input modality descriptors and operable to enable a user to determine the utilized subset by selecting one or more of the input modality descriptors in the displayed collection of input modality descriptors and thereby to indicate which ones of the generated user inputs should influence the output image; and at least one input visualization control distinct from the input generation tools and distinct from the input utilization control and operable to determine the visualized subset by selecting which ones of the generated user inputs should have their graphical indications displayed in the input area;

wherein the selection of which ones of the generated user input graphical indications should be displayed in the input area is independent of the selection of which ones of the generated user inputs should influence the output image.

27. A medium according to claim 26, wherein:

the input modalities comprise a segmentation input modality.

28. A medium according to claim 26, wherein:

the input modalities comprise a sketch input modality.

29. A medium according to claim 26, wherein:

the input modalities comprise an image input modality.

30. A medium according to claim 26, wherein:

the input modalities comprise a text input modality.

31. A medium according to claim 26, wherein:

the input utilization control enables the user to determine the utilized subset by selecting any subset of input modality descriptors from the displayed collection of input modality descriptors.

32. A medium according to claim 26, wherein the user interface further comprises:

a set of controls operable to enable modifying an input image, displayed in the input area, using any of the one or more input modalities.

33. A medium according to claim 26, wherein:

the input visualization control enables the user to determine the visualized subset by selecting any subset of input modality descriptors from an offered collection of two or more input modality descriptors.

34. A medium according to claim 26, wherein:

at least one of the input modality descriptors comprises a textual description of a respective one of the distinct input modalities.

* * * * *